INVENTORS
EUGENE FINDL
DOUGLAS G. MARLOW
WILLAM B. MASON
BY
Ronald Zibelli
ATTORNEY

United States Patent Office 3,508,879
Patented Apr. 28, 1970

3,508,879
ALIQUOTTING DEVICE
Eugene Findl, Granada Hills, and Douglas G. Marlow, Arcadia, Calif., and William B. Mason, Rochester, N.Y., assignors to Xerox Corporation, Rochester, N.Y., a corporation of New York
Filed Dec. 15, 1966, Ser. No. 602,080
Int. Cl. G01n 27/02, 31/00, 1/14
U.S. Cl. 23—253
13 Claims

ABSTRACT OF THE DISCLOSURE

This application relates to an automatic aliquoter having a hollow head having a measuring tube attached thereto, the measuring tube defining a measured portion of liquid, when the tube is completely filled, to be transferred from a liquid reservoir to a location remote therefrom. The hollow head is alternately connected to a source of vacuum and a source of pressure by valve means, and means are provided to sense when the measuring tube is completely filled and to terminate the withdrawal action of the vacuum source thereby leaving the measuring tube in a completely filled condition. When the measuring tube is oscillated to the remote location, the measuring tube is connected to the source of pressure so that the liquid can be expelled from the measuring tube.

---

Figure 1:
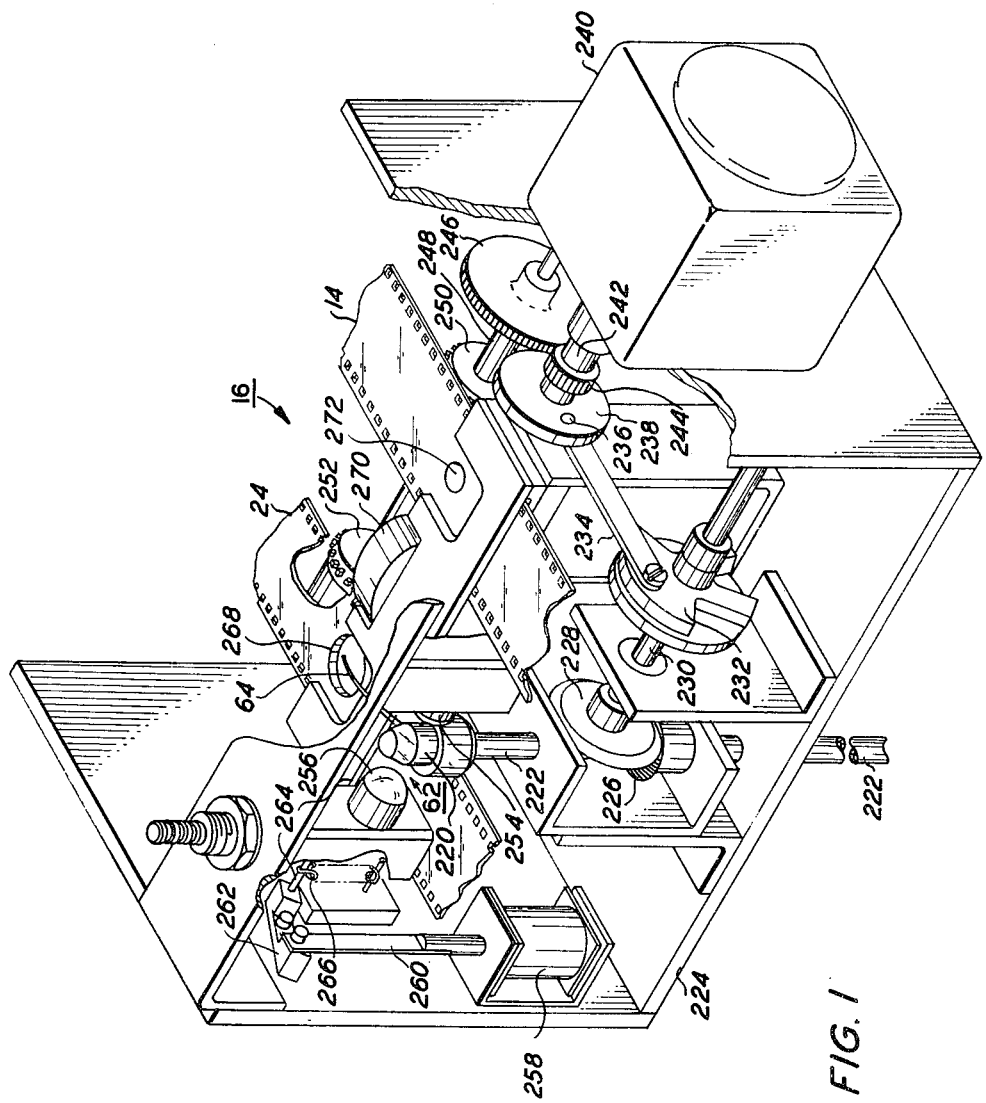

This invention relates to al iquid dispenser, and, more particularly, to an automatic aliquoter for picking up and transferring a measured portion of a liquid material from a reservoir and dispensing it in a remote location.

In the past, many routine, manual laboratory procedures have been conducted upon body fluids as an aid to the physician in determining, dignosing, or preventing the various ailments which afflict mankind. Many new devices have been developed to assist laboratory personnel in conducting the ever increasing number of tests. When using these devices it is generally desirable to transfer an accurate amount of sample material to each particular reaction site. Transfer of unequal amounts, for the same analytical procedure, prevents uniformity of results and limits the reliability which the physician can place upon the analytical data so obtained.

Recently, automatic analyzers have been developed which are capable of simultaneously conducting a plurality of different tests on a plurality of sample materials. Such analyzers are shown, for example, in co-pending application Ser. No. 603,404, filed concurrently herewith and assigned to the assignee of the present invention. Since the preceding exemplary automatic analyzers are capable of simultaneously performing a plurality of different tests, they are particularly suitable for conducting analyses where more than one test is to be conducted upon each particular sample material. When used in conjunction with such analyzers, each particular sample material, upon which a plurality of tests is to be run, will pass through the sample transfer station only once during which time the desired number of measured portions is aliquoted to different reaction sites containing prepackaged analytical reagents. After transfer, the sample carrying elements can be removed from the transfer station and eliminated. Since the analyzers need not be reprogrammed to make it capable of performing different analytical procedures, the measured portions of the sample material can be transferred immediately to the appropriate reaction site and no areas need be provided for the storage of the sample carrier as it awaits modification of the apparatus to perform different analytical procedures, as was necessary in prior art devices. Accordingly, to achieve the maximum utility and efficiency from automatic analyzers which are capable of simultaneously performing a plurality of different tests, it is desirable to provide a transfer device capable of transferring accurately measured portions of sample material from a sample storage site to a reaction site.

It is therefore an object of the present invention to provide a novel aliquoter for picking up an accurate amount of liquid from a reservoir and dispensing it at a remote location and system for the automatic analysis of fluid materials.

A still further object of the present invention is to provide a novel aliquoter for transporting a measured portion of a sample material from a sample storage site to a particular reaction site.

A still further object of the present invention is to provide a novel aliquoter for transporting a plurality of measured portions of a sample material from a single sample storage site to a plurality of discrete reaction sites.

A still further object of the present invention is to provide a novel aliquoter for use in conjunction with a reaction site carrying member having a plurality of reaction sites disposed thereon and a sample carrier having a plurality of sample storage sites, said reaction site carrying member being capable of being indexed forward independently of the indexing of said sample carrier.

It is a still further objection of the present invention to provide a novel aliquoter for transferring very small and accurate amounts of sample material.

Figure 2:
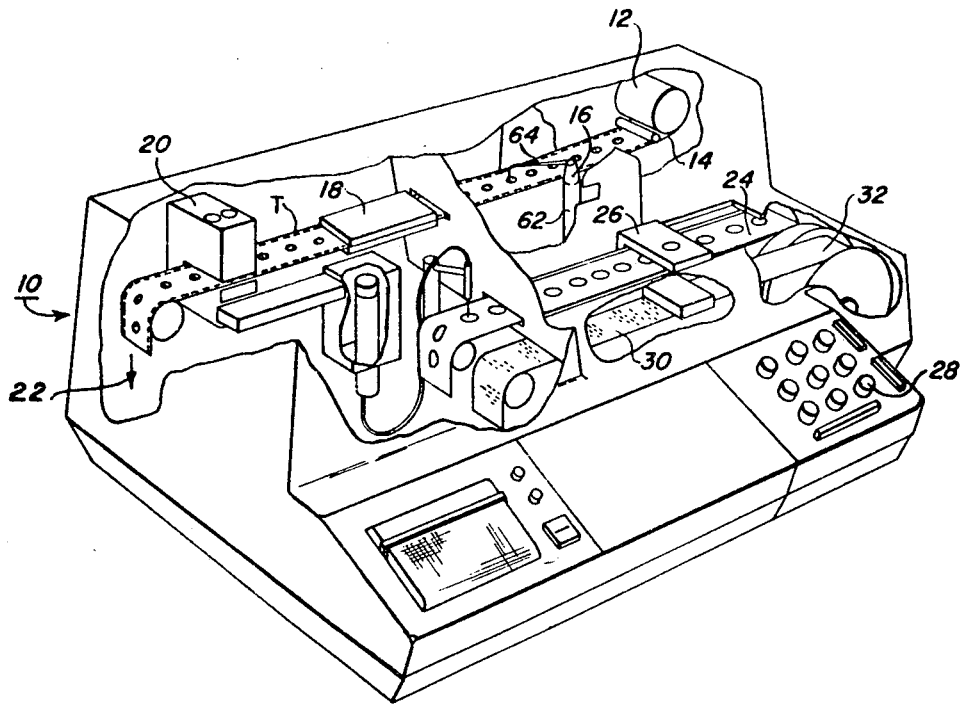
Figure 3:
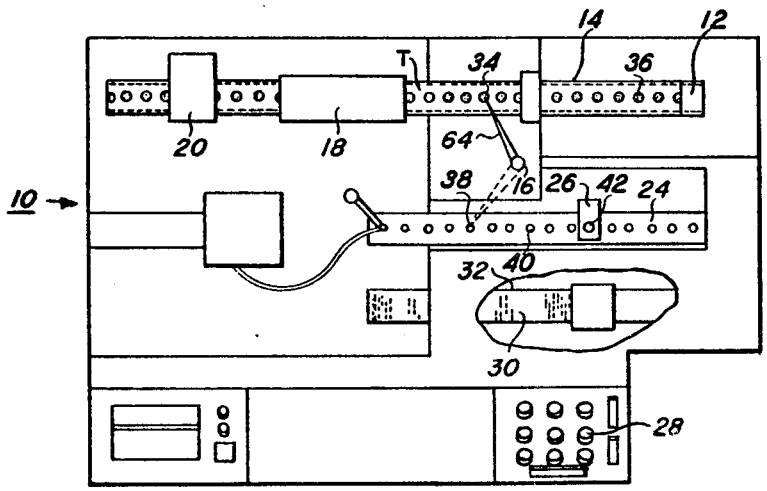

The above and still further objects, features, and advantages of the present invention will become apparent upon consideration of the following detailed disclosure of specific exemplary embodiments of the present invention wherein:

FIGURE 1 is a perspective view of the improved aliquoter of the present invention; and FIGURE 2 is a perspective view of an automatic analytical apparatus utilizing the improved aliquoter of the present invention; and FIGURE 3 is a top view of the automated apparatus of FIGURE 2.

Referring to FIGURE 1 there can be seen an automatic aliquoter for transferring a measured portion of a liquid sample material from a sample storage site to a reaction site. The aliquoter 62 is shown in conjunction with tape 24 and an analytical tape 14 bearing a plurality of sample storage sites and a plurality of discrete reaction sites, respectively, the overall automatic analyzer being shown more fully in FIGURES 2 and 3. However, it should be understood that the analyzer of FIGURES 2 and 3 is merely exemplary of automatic analyzers which can be used with the novel aliquoter of the present invention. Aliquoter 62 could also be used for transferring measured portions of sample material from a sample storage site or vessel to the disposable reaction containers as shown in Ser. Nos. 602,025 and 602,018, also concurrently filed herewith. Accordingly, many modifications can be made in the structure of the novel aliquoter, but without changing its essential operating characteristics, to adapt the aliquoter for use with different automatic analyzers.

Aliquoter 62 having non-wetting measuring tube 64 is positioned, in sample addition station 16, between sample holding tape 24 and analytical tape 14. The aliquoter consists essentially of a hollow head 220 having measuring tube 64 attached thereto. Head 220 is disposed at the uppermost end of a hollow shaft 222 which passes downwardly through frame 234 to vacuum and pressure lines and valves (not shown). Shaft 222 carries a bevel gear 226 which is in contact with a second bevel gear 228 on shaft 230. Shaft 230 is attached to oscillating disc 232 having a crank 234 attached to crank disc 238 by crank pin 236. A motor 240 is connected to disc 238 by shaft 242. Shaft 242 also carries a gear 244 which operates in conjunction with gear 246 and shaft 248 to rotate sprocket wheels 250 and 252 carrying analytical tape 14 and sample holding tape 24, respectively. A lamp 254 is placed on the opposite side of head 220 from a photocell 256. The lamp and photocell are so positioned that the first excess drop which forms on the internal end of measuring tube 64 can be sensed by this photoelectric setup. Solenoid 258 supported by frame 224 and having shaft 260 and arm 262 connected to depressor 264 operates in conjunction with spring 266, when the current to the solenoid is turned off, to cause measuring tube 64 to be depressed by depressor 264 into sample storage site 268 on sample holding tape 24. An absorbent tape 270 is positioned underneath the path of travel of the tip of measuring tube 64 and in slight contact therewith for the removal of any excess sample clinging to the outside of the measuring tube.

In operation, the measuring tube carried on the hollow head 220 oscillates through an angle sufficient to swing the tip of the measuring tube from the sample storage site 268 to the reaction site 272. This oscillatory motion is generated by crank 234 connected to continuously rotating crank disc 238 by pin 236. The reciprocating motion of oscillating disc 232 is transmitted to measuring tube 64 through bevel gear 228 and bevel gear 226 carried by shaft 222. The dwell phase at each end of the oscillatory motion is controlled by the design of the stroke of crank 234 and the amount of backlash existing between the ridges of bevel gears 226 and 228. With the measuring tube at its extreme position to the left, that is over the sample storage site 268, the oscillating disc 232 reverses but, because of the backlash and the dwell phase of the motion, the measuring tube remains over the sample storage site for a period of time sufficient to complete the following operations which fill the measuring tube with a measured portion of liquid sample.

Starting with the position as shown in FIGURE 1, the analytical tape 14 having a reaction site 272 and sample holding tape 24 having sample storing site 268 are drawn into position by revolving sprocket wheels 250 and 252, respectively. With the measuring tube 64 in its extreme oscillatory position to the left, that is over the sample storage site 268, a cam controlled microswitch (not shown) turns off the current to solenoid 258 allowing depressor 264 to move down and push the tip of the measuring tube into the sample storage site. The same microswitch which controls the current to the solenoid also actuates a valve (not shown) that connects the internal position of head 200 through shaft 222 to a vacuum which causes sample to be drawn up into the measuring tube. When the tube is full, a drop falls from the internal end thereof and intercepts the light beam from lamp 254. This interruption is sensed by photocell 256 which shuts off the vacuum, vents the head 220 through shaft 222 to atmospheric pressure, turns on the current to solenoid 258 which lifts depressor 264 allowing the measuring tube to emerge from the liquid sample.

With the dwell phase of the oscillatory motion ended, the measuring tube starts to move to the right. As it swings, the tip of measuring tube 64 comes in contact with paper tape 270 which removes any excess sample clinging to the outside of the tube. The swing continues to be extreme right position where the tip of the measuring tube is over reaction site 272. As with the extreme left position, the measuring tube remains in this extreme position because of the mechanical dwell phase in the operation of the crank. As soon as the extreme right position is reached, another cam-operated microswitch (not shown) operates a valve that connects head 220 through shaft 222 to a pressure source thus forcing the sample out of the measuring tube onto the reaction site. By the end of the dwell period, the sample has been completely expelled, the pressure valve is shut off, and the measuring tube begins to move again to the left. The continued operation of the aliquoter is merely a repetition of the herein described steps.

Many modifications can be made in the automatic aliquoter of FIGURE 1 to suit a particular desire or situation. For example, each sprocket wheel can have a separate drive means so that the analytical tape and the sample holding tape can be moved forward independently of the other. This is especially desirable where one wishes to transfer a plurality of measured portions from one sample holder to a plurality of different reaction sites. In such a situation, the sample holder would remain stationary while the reaction site-supporting analytical tape is progressively indexed forward.

The positioning of the aliquoter in conjunction with an exemplary automatic analyzer can be seen in FIGURES 2 and 3 wherein analyzer 10 has a magazine 12 for the storage of an analytical tape 14 bearing a plurality of testing sites 34, 36, etc. For simplicity, in these figures only one analytical tape T is shown being drawn through sample addition station 16, incubation station 18, detection station 20, and thereafter to disposal station 22. It should be understood, however, that for the most effective utilization of the analyzer it is contemplated that a plurality of analytical tapes will be used, each tape representing a carrier for a plurality of like analytical testing sites. There is also provided a sample carrier, in the form of tape 24 having a plurality of sample storage sites 38, 40, etc. for the storage of liquid samples immediately prior to the addition of the sample material to the testing site on the analytical tape. Indicate 26 having aperture 42 is automatically positioned over the proper storage site on sample carrier 24 to indicate to the technician exactly where the next sample is to be added to the sample carrier is to be placed. When carrier 24 is indexed forward to bring a new sample storage site into the transfer station, indicator 26 also moves forward and remains in registration with underlying unused sample storage site. After a sample is manually stored in the previously unused storage site, the indicator indexes one position backward on a signal from control panel 28 to clearly indicate to the technician the next unused sample storage site for placement of a further sample to be analyzed. Control panel 28 is provided for the technician to place appropriate instructions 30 on command tape 32. Instructions 30 cause the proper analytical tape to be indexed into position in sample addition station 16 for the subsequent addition of the sample material. Such instructions are especially useful when a plurality of tapes are stored in magazine 12, each tape having different reaction sites for different analytical tests.

In operation, the reaction site-supporting analytical tape is threaded through the apparatus from the magazine storage station 12 to the disposal station 22. Each tape has a corresponding drive means (not shown) which will cause the tape to be indexed one position at a time so that the tape can be sequentially drawn through the various stations. In the sample addition station 16, the sample material which is to be analyzed is withdrawn from tape 24 where it has been held in sample storage site 38. Revolving aliquoter 62, having an accurate measuring tube 64 oscillates in an arcuate path between sample carrier 24 and analytical tape T. Tube 64 is produced from a non-wetting material, for example polyethylene, to reduce or eliminate contamination caused by sample carryover. Positioned over sample carrier 24 the tube is lowered until the tip thereof is within the liquid sample material. A measured portion of the sample is withdrawn by a vacuum system (not shown) which operates until the measured portion completely fills the tube. With the tube filled, it rises and the aliquoter is caused to revolve until the tip of the measuring tube is positioned directly over reaction site 34 on the analytical tape. Slight pressure is placed on the internal end of them easuring tube forcing the liquid contents thereof out of the tube and onto the reaction site. With the sample transferred, the aliquoter is now ready for return to its initial position over a sample storage site in the sample carrier. The sample storage site can be the same storage site for transfer of at least one additional aliquoted portion of sample or a new sample storage site which has been indexed into position by the drive means (not shown) associated with the sample carrier.

From sample addition station 16 the analytical tape passes through incubation station 18 wherein the reaction mixture is maintained within the reaction site for a period of time sufficient to bring the mixture to the desired state for analysis. The incubation station should be of sufficient length or dimensions so that the reaction mixture will be held at the proper ambient conditions for the specified amount of time. The proper incubation time is achieved by causing the drive means to index at a particular rate which will bring the reaction mixture to the detection station at the proper time for analysis. In detection station 20 a beam of light is focused onto and through the reaction mixture within the reaction site supported by the analytical tape T and then to a detection unit, such as a photoelectric cell, which is responsive to the variations in light transmittance caused by varying amounts of a known constituent in the sample material. The electrical output signal, which is proportional to the amount of a particular constituent in the sample is converted into the meaningful data which, in turn, is fed into a control panel and storage device for its storage for future reference. Means are also provided to identify the particular sample as being from a particular source as well as the test being run thereon. Additionally, within the detection station the analytical data obtained can be immediately transferred to the analytical tape to provide a complete record for future reference. From the detection station, the analytical tape passes to the disposal station where the tape can be wound upon a take-up reel for storage or dropped into a disposal container, as is desired.

While the invention has been described with reference to a preferred embodiment thereof, it will be understood by those skilled in the art that various changes in form and details may be made without departing from the true spirit and scope of the invention. It should be understood that the present invention is not dependent upon the exact nature of the automatic analyzer with which the novel aliquoter of the present invention is utilized, rather the novel aliquoter can be modified or adapted for use with other analyzers provided the essential operating characteristics and other advantageous results of this invention are not adversely affected. In addition this device may be used for measuring and dispensing at a location remote from the original liquid reservoir in non-analytical applications. For example it may be useful for adding flavors, fragrances, or other ingredients to containers being advanced along a production line prior to their being mixed therein.

Accordingly, all substitutions, additions, and modifications of the present invention, or to which the present invention is readily susceptible without departing from the true spirit and scope of this disclosure, are considered part of the present invention.

What is claimed is:

1. An automated aliquoter comprising a hollow head having a measuring tube attached thereto, said measuring tube defining a measured portion of liquid, when said tube is completely filled, to be transferred from a liquid reservoir to a location remote therefrom; said measuring tube having an external tip, and an end connected to said hollow head; means to oscillate said hollow head and attached measuring tube between a first position where the tip of said measuring tube is over the liquid reservoir to a second position where the tip of said measuring tube is over the remote location; valve means operable to connect said measuring tube to a source of vacuum when said measuring tube is in said first position and to a source of pressure when said measuring tube is in said second position, said vacuum source causing liquid to be withdrawn from the liquid reservoir into said measuring tube and said pressure source causing the measured portion of liquid to be expelled from said measuring tube onto the remote location; means to automatically sense when said measuring tube is completely filled and to terminate the withdrawal operation of said vacuum source, thereby leaving said measuring tube in a completely filled condition; and means to cause said valve means to connect said measuring tube to said pressure source when said measuring tube is in said second position.

2. The automated aliquoter of claim 1 further including depressor means for positioning the tip of said measuring tube in the liquid contained within the liquid reservoir.

3. The automated aliquoter of claim 1 further including drive means for advancing a carrier having a liquid reservoir, and an analytical tape adjacent each side of said hollow shaft.

4. The automated aliquoter of claim 1 further including drive means for a carrier having at least one liquid reservoir and different drive means for an analytical tape whereby a plurality of measured portions of liquid can be aliquoted from a single reservoir on the carrier to a plurality of remote locations supported by the analytical tape.

5. The automated aliquoter of claim 1 wherein said oscillating means has first and second dwell phases associated with, respectively, said first position during which liquid is withdrawn from the liquid reservoir into said measuring tube and with said second position during which said liquid is expelled therefrom.

6. The automated aliquoter of claim 1 wherein said measuring tube comprises a non-wettable plastic material.

7. An automated analytical apparatus comprising means to move a plurality of sample storage sites past a sample transfer station; means to advance a plurality of discrete reaction sites past said sample transfer station; means at said transfer station to transfer a measured portion of a sample from one of the storage sites to at least one discrete reaction site, said transfer means including the aliquoter defined in claim 1; means to advance said sample storage site moving means after all sample transfer is complete; and detection means further along the path of travel of said reaction site advancing means to monitor at least one of the physical properties of the reaction mixture within the reaction site.

8. An automated aliquoter comprising a hollow head having a measuring tube attached thereto, said measuring tube defining a measured portion of liquid, when said tube is completed filled, to be transferred from a liquid reservoir to a location remote therefrom; said measuring tube having an external tip, and and end connected to said hollow head; means to oscillate said hollow head and attached measuring tube between a first position where the tip of said measuring tube is over the liquid reservoir to a second position where the tip of said measuring tube is over the remote location; valve means operable to connect said measuring tube to a source of vacuum when said measuring tube is in said first position and to a source of pressure when said measuring tube is in said second position, said vacuum source causing liquid to be withdrawn from the liquid reservoir into said measuring tube and said pressure source causing the measured portion of liquid to be expelled from said measuring tube onto the remote location; a lamp adjacent said hollow head on one side of said end of said measuring tube; means on the opposite side of said end of said measuring tube and optically coupled to said lamp for generating a signal in response to a variation in its light input caused by a drop of excess liquid drawn through said tube falling between said lamp and said signal generator means; a first switch actuated by said signal whereby when a drop of excess liquid momentarily interrupts the light input to said signal generator a signal is generated which terminates the operation of said vacuum source thereby leaving said measuring tube in a completely filled condition; and a second switch operable to connect said measuring tube to said pressure source when said measuring tube is in said second position.

9. The automated aliquoter of claim 8 wherein said oscillating means has first and second dwell phases associated with, respectively, said first position during which liquid is withdrawn from the liquid reservoir into said measuring tube and with said second position during which said liquid is expelled therefrom.

10. The automated aliquoter of claim 8 further including depressor means for positioning the tip of said measuring tube in the liquid contained within the liquid reservoir, said depressor means being deactuated by said signal whereby the tip of said measuring tube is removed from the liquid contained within the liquid reservoir.

11. The automated aliquoter of claim 8 wherein said measuring tube comprises a non-wettable plastic material.

12. An automated analytical apparatus comprising means to move a plurality of sample storage sites past a sample transfer station; means to advance a plurality of discrete reaction sites past said sample transfer station; means at said transfer station to transfer a measured portion of a sample from one of the storage sites to at least one discrete reaction site, said transfer means including the aliquoter defined in claim 8, means to advance said sample storage site moving means after all sample transfer is complete; and detection means further along the path of travel of said reaction site advancing means to monitor at least one of the physical properties of the reaction mixture within the reaction site.

13. An automated aliquoter comprising a hollow head having a measuring tube attached thereto, said measuring tube defining a measured portion of liquid, when said tube is completely filled, to be transferred from a liquid reservoir to a location remote therefrom; said measuring tube having an external tip, and an end connected to said hollow head; means to oscillate said head and attached measuring tube between a first position where the tip of said measuring tube is over the liquid reservoir to a second position where the tip of said measuring tube is over the remote location; valve means operable to connect said measuring tube to a source of vacuum when said measuring tube is in said first position and to a source of pressure when said measuring tube is in said second position, said vacuum source causing liquid to be withdrawn from the liquid reservoir into said measuring tube and said pressure source causing the measured portion of liquid to be expelled from said measuring tube onto the remote location; means to automatically sense when said measuring tube is completely filled and to terminate the withdrawal operation of said vacuum source, thereby leaving said measuring tube in a completely filled condition; means to cause said valve means to connect said measuring tube to said pressure source when said measuring tube is in said second position; and absorbent material positioned underneath the arcuate path of travel of the tip of said measuring tube, said tip during oscillation coming into slight contact with said absorbent material for removing excess liquid clinging to the outside of said measuring tube.

References Cited
UNITED STATES PATENTS

| | | | |
|---|---|---|---|
| 3,025,405 | 3/1962 | Dodas | 250—218 |
| 3,036,893 | 5/1962 | Natelson | 23—253 X |
| 3,143,393 | 8/1964 | De Seguin | 23—253 |
| 3,193,358 | 7/1965 | Baruch | 23—253 |
| 3,193,359 | 7/1965 | Baruch et al. | 23—253 X |
| 3,098,719 | 7/1963 | Skeggs | 23—253 |

JOSEPH SCOVRONEK, Primary Examiner

U.S. Cl. X.R.

23—259; 73—423; 141—90, 94, 130, 192